3,378,338
PRODUCTION OF HIGH-PURITY
ALUMINIUM CHLORIDE
Leslie Jack Derham and Richard Jekyll Kingdom, Avonmouth, England, assignors to Imperial Smelting Corporation (N.S.C.) Limited, London, England, a British company
Filed Sept. 17, 1965, Ser. No. 488,000
Claims priority, application Great Britain, May 27, 1965, 25,012/65
6 Claims. (Cl. 23—93)

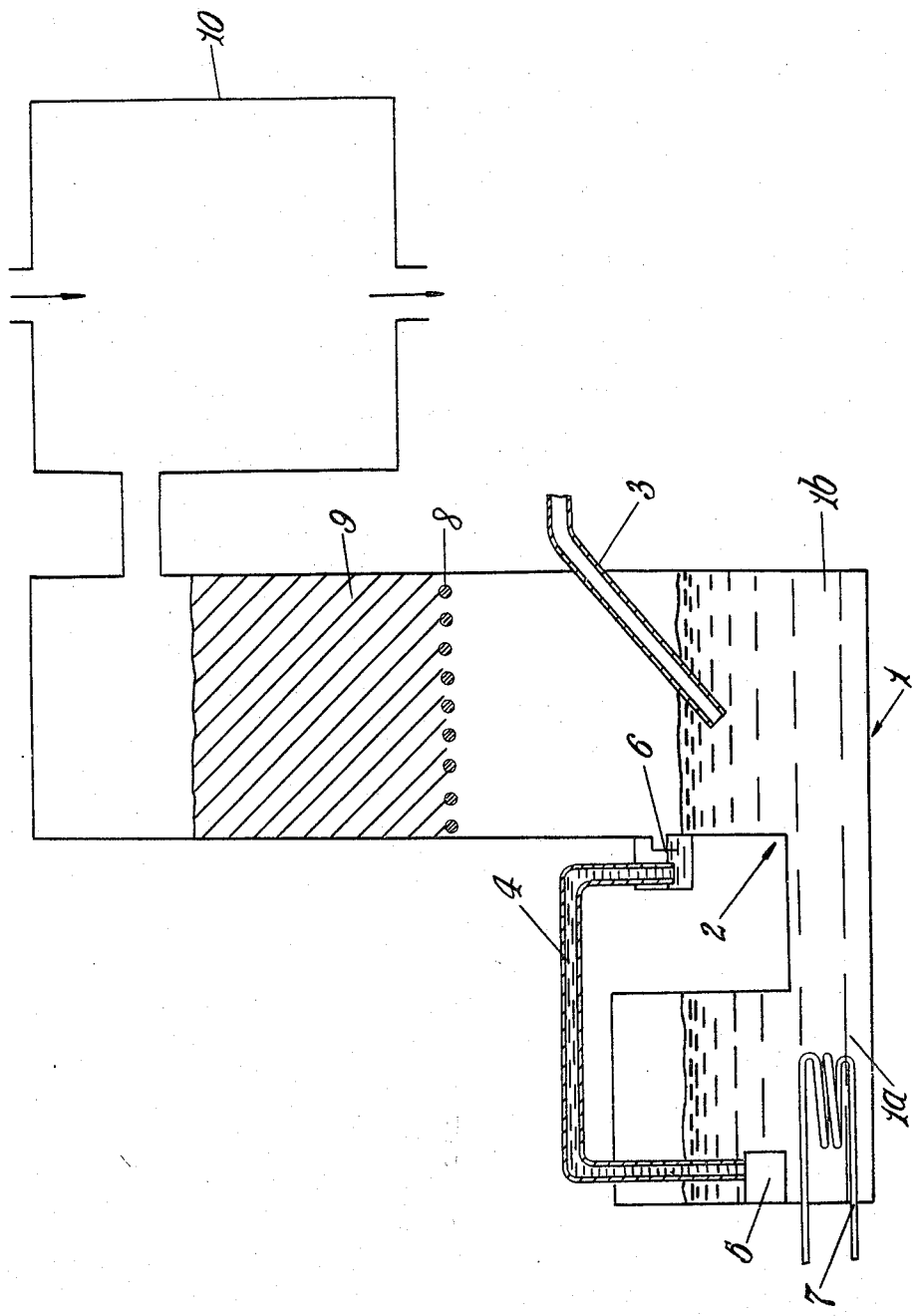

ABSTRACT OF THE DISCLOSURE

A method of preparing high-purity aluminium chloride comprises passing chlorine gas into a molten zinc-aluminium alloy hold at a temperature from 385° to 430° C. by way of a ceramic nozzle and keeping the aluminium chloride vapour evolved out of contact with materials other than aluminium.

The present invention relates to a process for the production of high-purity aluminium chloride especially useful for incorporation as a vapour into the reaction system of a plant in which titanium dioxide is produced by the oxidation of titanium tetrachloride vapour.

It is known to be desirable, when producing titanium dioxide by the "chloride route" to provide a preformed, finely divided, white, non-discolouring metal oxide solid as a nucleating agent for the titanium dioxide formed by oxidation of the chloride. One way in which this can be done is by oxidising a stream of a metal chloride such as aluminium chloride in situ in the titanium dioxide reactor. Thus a steady continuous stream of very high-purity aluminium chloride is desirable for this purpose and whereas the prior art methods of production have provided continuous streams of aluminium chloride vapour the purity of the product has not previously been easy to control.

A prior proposal to which the present invention is related is described in U.S. Patent No. 3,152,864. This discloses a process for the production of aluminium chloride in which chlorine is passed into a bath of molten zinc/aluminium alloy held at a temperature within the range 430°–500° C., the zinc/aluminium alloy being cooled in a separate section of the vessel and subsequently recirculated to the reaction zone.

The advantages of carrying out the chloride formation reaction in a bath of molten zinc/aluminium alloy are that the presence of zinc allows the reaction to be carried out at a much lower temperature than would otherwise be possible and that the circulating molten alloy serves to remove heat of reaction from the chlorination zone to a separate heat-dissipation zone.

The aluminium in solution in the zinc is chlorinated preferentially, leaving impurities such as Fe, Pb, Cu etc. in the bath metal.

However, the invention described in this publication is not exclusively, or even primarily, related to the production of $TiO_2$. Thus, the previous process envisages the production of powdered, crystalline, or massive aluminium chloride. One major outlet for such a product is to provide the reactant in industrial Friedel-Krafts reactions.

For this purpose relatively impure aluminium chloride is satisfactory.

Until recent developments in the production of $TiO_2$ by the chloride route, the necessity for highly pure $AlCl_3$ was not fully appreciated. However, even traces of iron in the finished product can affect the whiteness, and the present invention sets out to provide a purer aluminium chloride than hitherto free of such deleterious traces of iron.

This production of high-purity $AlCl_3$ vapour is effected by the combination of a number of features which have the effect of reducing the iron concentration level in the bath of molten alloy, reducing the amount of iron chloride volatilized and minimizing any contamination of the aluminium chloride with iron in the apparatus above the level of the molten alloy.

The invention consists in a method of preparing high-purity anhydrous aluminium chloride, which comprises holding a body of molten zinc-aluminium alloy at a temperature between the eutectic and 500° C., in a vessel divided into two intercommunicating parts; injecting chlorine gas through a ceramic nozzle below the surface of the alloy in one part of the vessel to form aluminium chloride vapour; allowing the vapour to pass upwards through a layer of pieces of aluminium, the whole vapour path being within a duct formed of or coated with aluminium; cooling the molten alloy in the other part of the vessel; and maintaining a circulatory motion by transferring cooled alloy back into the first portion of the vessel.

It is preferred to carry out this process at as low a temperature as practicable, and from 385° C. (the eutectic) to 430° is a preferred range. In some respects from 400 to 420 is convenient. Of course the operation of the process at a temperature below 430° C. imposes certain restrictions on the composition of the zinc/aluminium alloy which can be used and in general the aluminium content of the alloy should be less than 10% and preferably less than 5–6% and should be consistent with the formation of a molten zinc/aluminium alloy at the temperature of operation.

The nozzle is preferably made of fused silica since this has a sufficient mechanical strength in the bath of turbulent metal at high temperatures.

One preferred feature is to so adjust the chlorine flow-rate that the bubble produced reaches the alloy surface free from chlorine and consisting of pure aluminium chloride.

The method of the invention is preferably incorporated into a process for $TiO_2$-production, and such a process incorporating aluminium chloride production constitutes a major aspect of the invention. A further major aspect of the invention resides in the apparatus used, that is to say, in apparatus for preparing high-purity anhydrous aluminium chloride comprising a vessel divided into two intercommunicating parts by an underflow baffle for holding a body of molten zinc/aluminium alloy; a ceramic nozzle in a first part of the vessel; a duct for removal of aluminium chloride above the said first part of the vessel said duct having an aluminium inner surface; a layer of pieces of aluminium in said duct; means for cooling the molten alloy in the second part of said vessel; and pump means to convey cooled alloy back to the said first part from said second part thereby causing a circulatory motion of alloy beneath said underflow baffle.

The correlation between the features of the invention will be seen from the following explanation.

Firstly, the temperature is, overall, kept between 385° and 500°, and preferably below 430°. It should, however, be remembered that one part of the vessel will be, generally speaking, cooler than the other part, by virtue of the cooling launder and coils. Moreover, there will be localities of even cooler alloy, so that too high a proportion of aluminium should be avoided in case accretion form on the coils. Then, on the other portion there are local high temperatures where the jet enters the alloy.

The overall iron content of the bath is, surprisingly, not of major importance. In practice the bath will always contain some iron, not so much from added impurities but from the material of the bath construction or of any circulating pump used. The walls of the bath appear to become coated with some sort of intermetallic compound which minimises corrosion and take-up of iron. However, the pump itself is always presenting a fresh surface to the alloy and is a source of iron contamination to the bath. Although the iron content of the bath is not a major cause of iron contamination in the vapour, it is only sensible to keep to as low a level as possible, and this is facilitated by relatively low temperature working, as described above.

Perhaps the major cause of iron contamination in the vapour has hitherto been the use of a stainless steel tube to inject the chlorine. This appears to stem from two factors, firstly, the local overheating at the nozzle outlet, due to the highly exothermic reaction between chlorine and aluminium and secondly, because of the turbulent gas/molten alloy medium which facilitates the escape of the iron chloride formed at these higher temperatures. Here again, a lower overall temperature reduces the temperature attained in the locally overheated region while a carefully controlled flow of chlorine introduced in a manner which allows the best possible gas/metal contact by the formation of small bubbles prevents local overchlorination and the formation of iron chloride. If any iron enters the bath from the corrosion of the nozzle it will be less dangerous, but in any case the present invention envisages the uses of a ceramic, e.g., fused silica, nozzle to eliminate corrosion.

Another valuable effect of controlling the chlorine flow to reduce turbulence is that it also reduces the possibility of chlorine, as such, reaching the surface and corroding any metal surface, leading to impurities being present as vapour. (Although it is impossible to give figures of an acceptable chlorine flow rate, since this depends on the depth and design of the nozzle below the surface and the temperature of the alloy within the range stated, it is a simple matter to test for chlorine in the vapour evolved.)

A still further combined feature is associated with this chlorine evolution. It is impossible to eliminate this completely, and although the layer of pieces of aluminium can remove this chlorine, it is not so efficient at removing any iron chloride which might have been formed by contact between the chlorine and any iron surface between the alloy and the layer of pieces of aluminium. It is because of this that the connecting duct or chimney is formed of or coated with aluminium sheet. Steel coated with aluminium is preferred for mechanical strength.

In a proper appreciation of the present invention it must be borne in mind that criteria which might apply to a crude process do not necessarily apply to high-purity processes. The present invention does not reside in indiscriminate use of substitute materials, but stems from a critical re-examination of a process in outline known but not hitherto operated to obtain a maximum purity product as the main objective. We have discovered which features are critical to the purity of the product and which are not, and have combined two important process features (a generally lower range of temperatures and a controlled lower chlorine input rate with consequent smaller bubble size) with a selective and discriminate substitution of the materials in certain key parts of the equipment, more especially in the chlorine-injecting nozzle.

In respect of this latter point, it will be observed that it is not necessary to replace steel, which has advantages of strength, ease of fabrication, cheapness, and of allowing easy temperature control, as the material for constructing the holding bath.

The invention will be further described with reference to the accompanying drawings the single figure of which is a section through a suitable form of apparatus.

The apparatus shown consists of a steel vessel 1 provided with underflow baffle 2 which divides it into two parts 1a and 1b. A further pipe 4 fitted with pump 5 extends from a position near the bottom of part 1a through the baffle 2 and via gate 6 leads into part 1b.

Water cooling coils 7 are provided in part 1a to take up the heat of reaction, as described below.

Above the chlorine inlet pipe 3, in an extension of vessel 1, is an aluminium-coated steel grating 8, upon which a bed of granulated aluminium 9 is provided. The space above this bed is connected to a duct carrying a stream of titanium tetrachloride vapour and the aluminium chloride undergoes oxidation jointly with the titanium tetrachloride, thus forming small particles of $Al_2O_3$ which act as nuclei for $TiO_2$ grain growth.

This process is shown schematically by a block 10, the part of vessel 1 above the alloy surface, and communicating with the $TiO_2$ process is aluminium-lined. When operation is commenced, a zinc/aluminium alloy is added to vessel 1 and initially heated to a temperature not above 430° C.

As the metal circulates in part 1b of the vessel chlorine gas is introduced through a chlorine inlet pipe 3 below the surface of the alloy. The heat of formation of aluminium chloride is sufficient to maintain the necessary temperature during operation, so no further heating is required, in fact cooling coils 7, are provided so that the alloy circulating to part 1a of the vessel (by virtue of the circulation induced by pump 5 pumping alloy through pipe 4 and gate 6) can be kept within the above temperature limits. To prevent condensation of aluminium chloride in part 1b of vessel the temperature at the top of the vessel is maintained slightly above 200° C.

Excess chlorine gas must on no account pass from vessel 2 to condenser 4. To guard against this, the $AlCl_3$ vapour produced in part 1b of vessel 1 is made to pass upwardly through the bed of granulated aluminium resting on the aluminium-coated grating 8. In this way any chlorine in the vapour attacks the granulated aluminium and is converted to aluminium chloride.

The zinc acts as a vehicle to hold the aluminium and thereby enables the reaction to be carried out at a lower temperature than if aluminium alone were used.

The ratio of zinc to aluminium in the alloy in vessel 1 is critical to the extent that the alloy must be molten at the low temperature used. A preferred working ratio uses below 10% and preferably below 5–6% by weight of aluminium.

We claim:

1. In the method of preparing high-purity, anhydrous aluminium chloride which comprises injecting chlorine into a molten-zinc aluminium alloy, the improvement in combination therewith which comprises
    (i) holding a body of molten zinc-aluminium alloy at a temperature within the range of 385° to 430° C. in a vessel divided into two intercommunicating parts;
    (ii) injecting chlorine gas, through a ceramic nozzle, below the surface of the alloy in a first part of the vessel, to form aluminium chloride vapour;
    (iii) allowing the vapour so formed to pass upwards through a layer of pieces of aluminium, all surfaces with which the vapour comes in contact being of aluminium;
    (iv) cooling the molten alloy in the second part of said vessel; and
    (v) maintaining a circulatory motion by transferring cooled alloy back into the first part of said vessel.

2. A method as claimed in claim 1 wherein the body of molten alloy is held at a temperature between 400° and 420° C.

3. A method as claimed in claim 1 wherein the alloy contains less than 6% by weight of aluminium.

4. A method as claimed in claim 1 wherein the nozzle, through which the chlorine is injected, is of fused silica.

5. A method as claimed in claim 1 wherein the flow rate of the chlorine is such that the bubble of gas reaches the alloy surface free from chlorine.

6. A method as claimed in claim 1 wherein the aluminium chloride vapour produced is directly incorporated into the reaction system of a plant wherein titanium tetrachloride is oxidised to titanium dioxide, whereby the aluminium oxide particles formed act as nuclei for the growth of titanium dioxide particles.

References Cited

UNITED STATES PATENTS

| | | | |
|---|---|---|---|
| 1,165,065 | 12/1915 | Brooks | 23—93 |
| 2,670,275 | 2/1954 | Olson et al. | 23—202 |
| 2,705,186 | 3/1955 | Hardy et al. | 23—93 |
| 2,768,070 | 10/1956 | Brazaitis | 23—93 XR |
| 3,078,145 | 2/1963 | Gayol | 23—93 |
| 3,152,864 | 10/1964 | Derham | 23—93 |
| 3,222,127 | 12/1965 | Wilson | 23—93 |
| 3,236,608 | 2/1966 | Cavidini et al. | 23—93 XR |

FOREIGN PATENTS

| | | |
|---|---|---|
| 317,259 | 8/1929 | Great Britain. |
| 992,668 | 5/1965 | Great Britain. |

MILTON WEISSMAN, *Primary Examiner.*

EDWARD STERN, *Examiner.*